Figure 1:
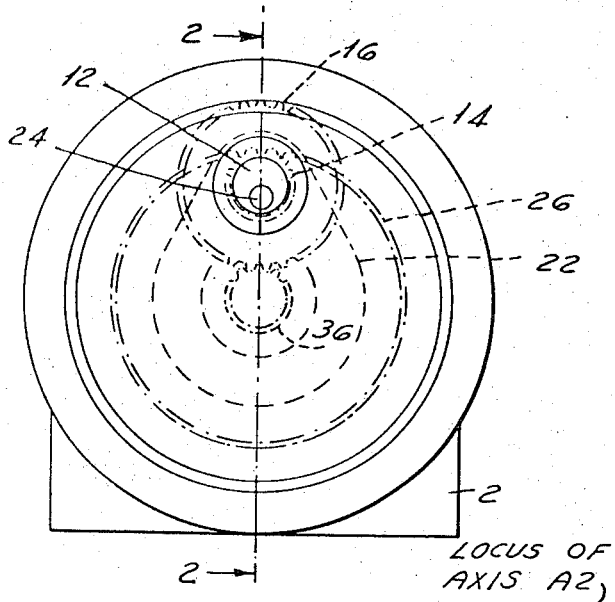

United States Patent [19]

Brems

[11] 3,837,473

[45] Sept. 24, 1974

[54] MECHANICAL DRIVE FOR TRANSFER SYSTEM

[76] Inventor: John Henry Brems, 32867 White Oaks Trl., Birmingham, Mich. 48010

[22] Filed: June 26, 1972

[21] Appl. No.: 266,454

[52] U.S. Cl. ............................................. 198/219
[51] Int. Cl. .............................................. B65g 25/04
[58] Field of Search ............ 74/52, 86, 26; 198/219, 198/218, 220 DA, 220 DB

[56] References Cited
UNITED STATES PATENTS

| | | | |
|---|---|---|---|
| 2,315,205 | 3/1943 | Herold | 198/219 |
| 2,583,968 | 1/1952 | Rosseau | 198/221 X |
| 3,703,103 | 11/1972 | Davies | 74/86 |

*Primary Examiner*—Evon C. Blunk
*Assistant Examiner*—Douglas D. Watts
*Attorney, Agent, or Firm*—Barnes, Kisselle, Raisch & Choate

[57] ABSTRACT

A mechanical drive system for a transfer system using a transfer bar and a power bar which can provide a smooth acceleration and deceleration including a power system with a rotary input, and an output which is quadratic in following a continuous path having two parallel strokes in opposite directions and two parallel strokes normal to the other strokes, and an interconnection which results in the transfer bars moving together during two of the four strokes and moving relative to each other in the other two strokes.

15 Claims, 16 Drawing Figures

MECHANICAL DRIVE FOR TRANSFER SYSTEM

This invention relates to an all mechanical drive system for actuating the transfer bar and power bar of a mechanical accumulator such as that disclosed in my copending application, Serial No. 163,666, filed July 19, 1971, entitled "Accumulating Conveyor."

It is an object of this invention to provide an all mechanical drive system which is inherently capable of generating the motions required by the aforesaid mechanical accumulator.

It is a further object of this invention to provide an all mechanical drive system which provides a smoothly accelerated and decelerated motion for each of the four discreet movements required by the aforesaid mechanical accumulator.

It is a further object of this invention to provide an all mechanical drive system in which the movement of the power bar relative to the transfer bar may be easily modified.

It is a further object of this invention to provide an all mechanical drive system in which the combined stroke of the transfer bar and power bar may be changed from application to application by the alteration of a single construction parameter.

It is a further object of this invention to provide an all mechanical drive system which will uncouple from the driven members whenever the direct load exceeds a certain predetermined value, and subsequently when the cause of the excessive load has been removed, to be reset through a momentary reversal of the drive mechanism.

Other objects and features of the invention will be apparent in the following description, claims, and accompanying drawings in which the principles of operation and use are set forth in connection with the best mode presently contemplated for the practice of the invention.

Drawings accompany the disclosure and the various views thereof may be briefly described as:

FIG. 1, an outside elevation of the drive mechanism.

Figure 2:
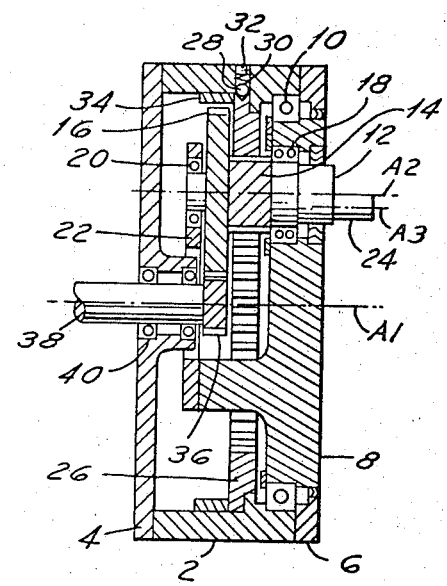

FIG. 2, a sectional view on line 2—2 of FIG. 1.

Figure 3:
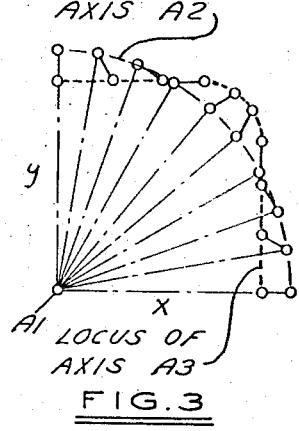

FIG. 3, a diagrammatic view of one quadrant output of the drive mechanism.

Figure 4:
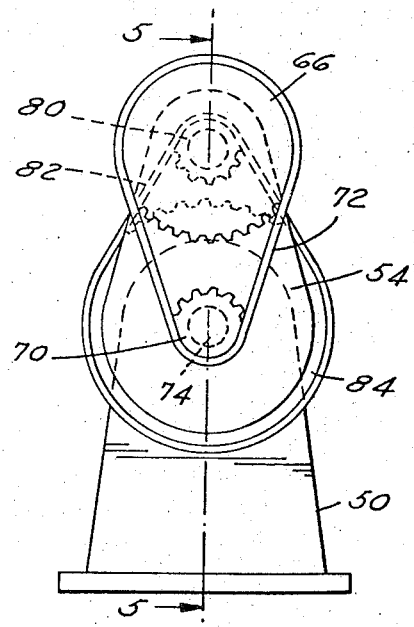

FIG. 4, an elevation of a modified embodiment of the invention using a chain or belt drive.

Figure 5:
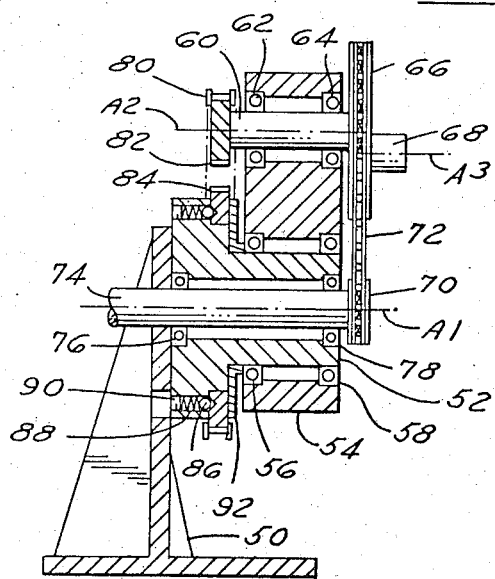

FIG. 5, a sectional view of the embodiment shown in FIG. 4 taken on line 5—5.

Figure 6:
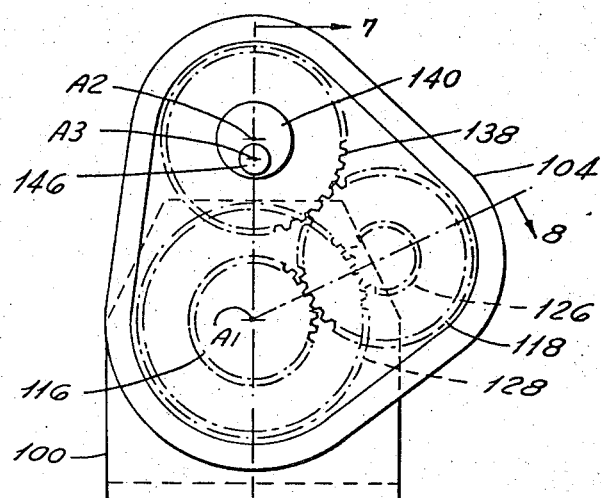

FIG. 6, an elevation of a second modification of the drive mechanism.

Figure 7:
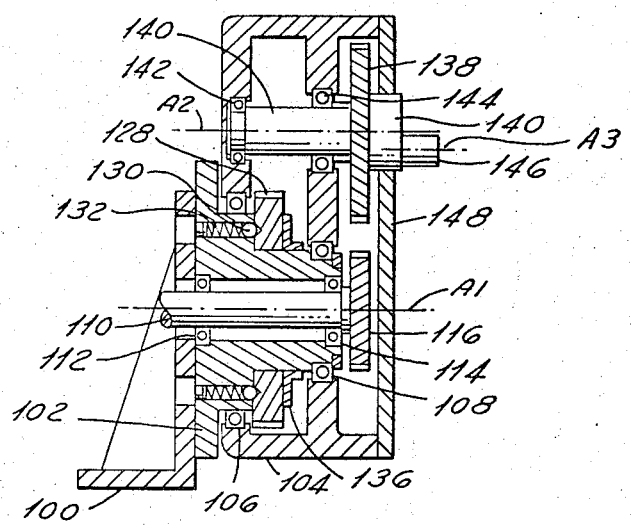

FIG. 7, a sectional view on line 7—7 of FIG. 6.

Figure 8:
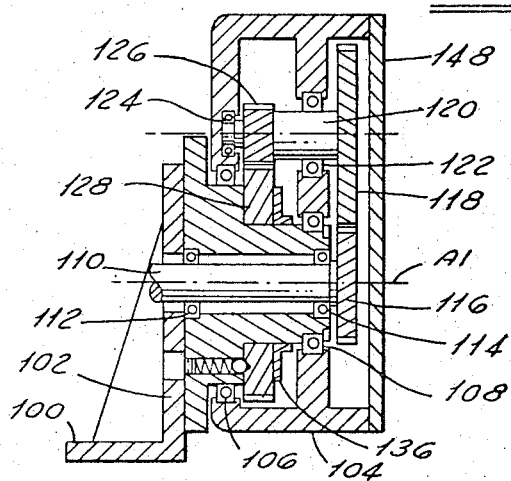

FIG. 8, a sectional view on line 8—8 of FIG. 6.

Figure 9:
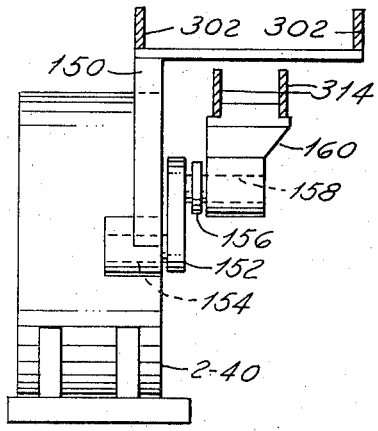

FIG. 9, a sectional view of a transfer machine.

Figure 10:
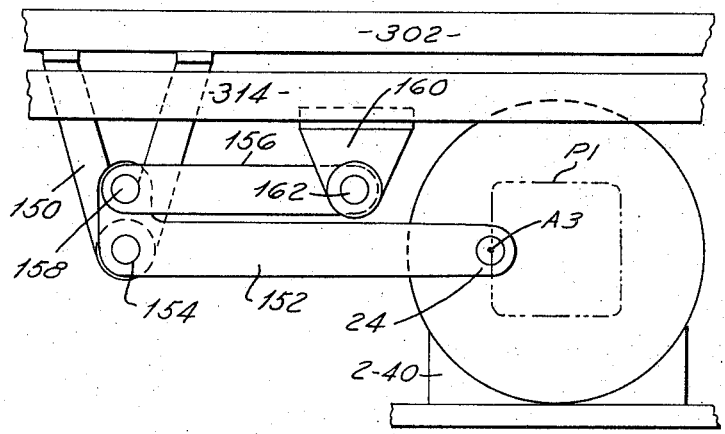

FIG. 10, an elevation of major elements of a transfer machine.

FIGS. 11 to 14, diagrammatic presentations of various positions of the transfer machine actuated by the drive mechanism.

Figures 15, 16:
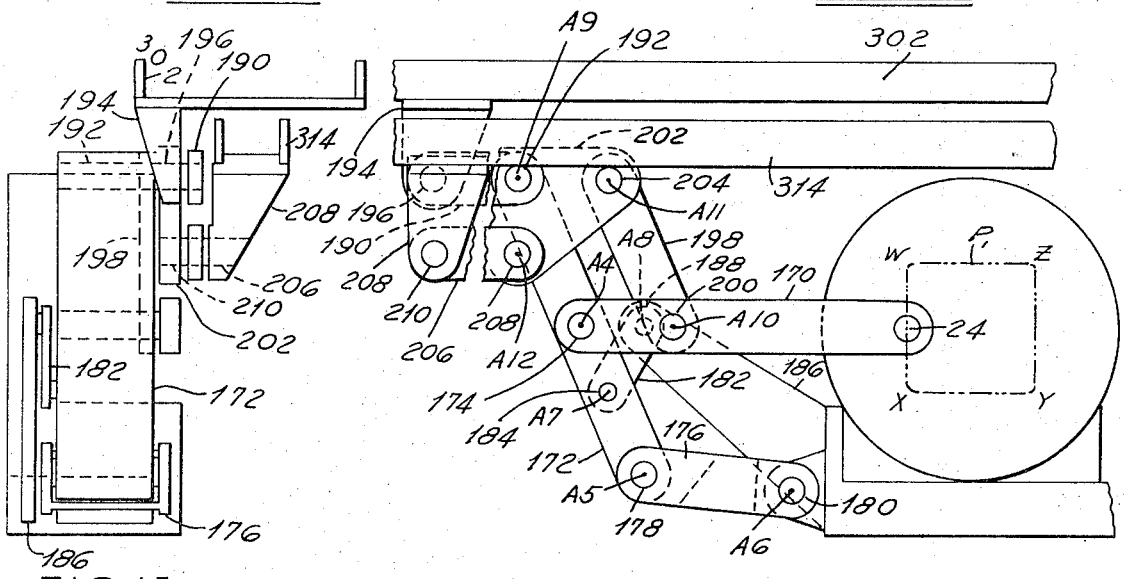

FIG. 15, an end view of a modified transfer system.

FIG. 16, a side elevation of the modified transfer system.

Referring to FIGS. 1 and 2, the case assembly is made up of a case 2, an input cover 4 and an output cover 6. A planetary carrier 8 is mounted in the case 2 through a double contact bearing 10. A planetary cluster is made up of a planetary shaft 12, a planetary gear 14, and a cluster gear 16 which rotate as a unit about axis A2; the planetary shaft 14 is mounted through bearing 18 in the planetary carrier 8 and through bearing 20 in the planetary carrier extension plate 22 which is rigidly bolted to the planetary carrier 8. An output shaft 24 is mounted to the planetary shaft 12 with a predetermined eccentricity, i.e., the centerline A3 of the output shaft 24 is displaced from the centerline A2 of the planetary shaft 12.

The planetary gear 14 is suitably formed to mesh with an internal gear 26 mounted in the case 2. This gear 26 is concentric with the axis A1 of the planetary carrier 8; this gear 26 is normally prevented from rotating within the case 2 through the action of the detent assembly consisting of ball 28, spring 30, and retainer 32. The ball 28 seats in a conical pocket in the gear 26, retaining the gear from rotating until a certain predetermined load is reached; if this load is exceeded, the gear 26 is free to rotate. The gear 26 is axially positioned in the case by retainer ring 34.

An input gear 36 is mounted on an input shaft 38 mounted in bearings 40 in the input cover 4. This input gear 36 is suitably formed to mesh with the cluster gear 16.

When the input shaft 38 is rotated by some external drive means, it causes the cluster gear 16 to rotate about the (moving) axis A2, thereby causing the planetary gear 14 to rotate. This causes the planetary carrier 8 to rotate about the axis A1. For the functions intended, the pitch diameter of the planetary gear 14 will be made substantially ¼ of the pitch diameter of the internal gear 26. Therefore, for each revolution of the planetary carrier 8 about axis A1, the shaft 12 will make four revolutions about the moving axis A2.

The output shaft 24 is concentric about an axis A3 which is displaced from the axis A2 by some distance which is defined as the eccentricity. More particularly, to eliminate the effects of scale, the eccentricity will be defined as the ratio of the distance from A2 to A3 to the distance from axis A1 to A2. When this value is chosen in the approximate range of 1/9 to 2/9, a very useful output may be derived from the translational output characteristics of the output shaft 24.

An example of the translational behavior of the shaft 24 during one rotation of the planetary gear 14 with respect to the internal gear 26 may be visualized by reference to the quadrant view of FIG. 3, a series of superimposed schematic sketches of the mechanism taken at 10° intervals of rotation of the planetary carrier 8. A total of 90° of planetary carrier 8 rotation are shown, representing 360° of planetary gear 14 rotation with respect to the planetary carrier. It will be understood that the behavior of the system in each of the other three quadrants will be symmetrical with that of the single quadrant shown in FIG. 3. The eccentricity between axis A3 and A2 utilized in the mechanism in FIG. 3 is ⅛ of the distance from the axis A1 to the axis A2. For reference purposes, two axes of motion, X and Y are shown.

During a complete rotation of the planetary carrier 8, the path followed by the axis A3 will be a near square with four equal substantially straight sides and four rounded corners. Equally important, if the planetary gear 14 rotates at a constant angular velocity, the movement characteristics of the axis A3 along its path is such that it starts each side with a near zero velocity component along the axis parallel to that side, smoothly accelerates to a maximum velocity during its traverse of that side, reaches a peak velocity at the center of that side, smoothly decelerates as it approaches the next corner, and finally achieves a near zero velocity component along the axis parallel to that side as it reaches the end of the corner.

Essentially then, the movement pattern of the axis A3 may be considered as four sequential legs, each of which is substantially straight, and along which the axis A3 accelerates and decelerates reaching a peak velocity along that leg at the center of that leg starting at a near zero velocity at the beginning of that leg and reaching a near zero velocity at the end of that leg.

A second embodiment of the mechanism is shown in FIGS. 4 and 5. Referring to these figures, a frame 50 supports a base ring 52. A rotating arm 54 is mounted on the base ring 52 through bearings 56 and 58 through which it rotates on a fixed axis A1. A planetary shaft 60 is mounted in the outboard end of the arm 54 through bearings 62 and 64 and rotates on a moving axis A2.

A sprocket 66 is rigidly attached to shaft 60, and an output shaft 68 is rigidly attached to the assembly made of shaft 60 and sprocket 66. This output shaft rotates on an axis A3 which is displaced from and is therefore eccentric to axis A2.

An input sprocket 70 rotating on the axis A1 drives the sprocket 66 through a chain 72. The sprocket 70 is in turn mounted on and driven by an input shaft 74 mounted in the base ring 52 through bearings 76 and 78.

A planetary sprocket 80 is rigidly attached to shaft 60. A chain 82 connects the sprocket 80 to a stationary sprocket 84 which is mounted on the base ring 52. Two ball detent assemblies, consisting of balls 86, springs 88, and retainers 90 mounted in the base ring 52 engage conical seats in the sprocket 84 and prevent it from rotating on the base ring 52 until a preset overload torque is reached. A retainer ring 92 keeps the sprocket 84 properly seated on the base ring 52. The tooth ratio between the sprocket 80 and the sprocket 84 is 1 to 4, i.e., the sprocket 84 has four times as many teeth as the sprocket 80, and the pitch diameter of the sprocket 84 is approximately four times as large as the pitch diameter of the sprocket 80. Therefore, for each revolution of the arm 54 about the axis A1, the shaft 60 rotates four complete revolutions about the axis A2.

When the input shaft 74 is rotated by some external drive means, it causes the sprocket 70 to drive the sprocket 66 through the chain 72. This in turn causes the shaft 60 to rotate about its axis A2, and the sprocket 80 in mesh with chain 82 causes the arm 54 to rotate about axis A1. Since the sprocket 84 has four times as many teeth as sprocket 80, the arm 54 will rotate once around axis A1 for every four revolutions of the shaft 80 with respect to arm 54.

It can be seen, therefore, that the mechanism of FIGS. 4 and 5 is the kinematic equivalent of the mechanism of FIGS. 1 and 2, and that the path of the output shaft 68 and its axis A3 will be identical with that described by the output shaft 24, if the generating distances of axis A1 to axis A2 and the eccentricities are identical.

A third embodiment of this same mechanism is shown in FIGS. 6, 7 and 8. The key characteristics of the mechanisms previously described is that an output shaft on an axis A3 rotates about a second moving axis A2 at a relative angular rate four times greater and in the opposite direction than that axis A2 rotates about a fixed axis A1.

This same effect is accomplished in a different way in the following embodiment. Referring to FIGS. 6, 7 and 8, a frame 100 supports a base ring 102 which in turn rotatably supports a case 104 through bearings 106 and 108.

An input shaft 110 is supported in the base ring 102 through bearings 112 and 114. Both the input shaft 110 and the case 104 rotate about the fixed axis A1. An input gear 116 is mounted on the input shaft 110, and meshes with an intermediate gear 118 mounted on an intermediate shaft 120 which is mounted in the case 104 through bearings 122 and 124. A drive gear 126 is mounted on shaft 120, and is suitably formed to mesh with a stationary gear 128 mounted on the base ring 102. The gear 128 is maintained in a stationary position, until some predetermined overload torque is reached, by two ball detent assemblies consisting of balls 130, springs 132, and retainers 134, mounted in the base ring 102. A spacer ring 136 is fastened to the base ring 102 and maintains the axial position of the gear 128.

The intermediate gear 118 also meshes with gear 138 mounted on shaft 140 rotating on axis A2 in bearings 142 and 144 mounted in the case 104. The output shaft 146 is mounted to the shaft 140 and rotates about an axis A3 which is eccentric to the axis A2. A cover 148 is bolted to the case 104 and is used to seal the entire gear train.

It can be seen that when the input shaft 110 is rotated, the gear 116 causes the gear 118 to rotate. This in turn causes the gear 126 to rotate, driving the case 104, and all components mounted therein in a rotary motion about axis A1, since the gear 126 is in mesh with the stationary gear 128. The only restriction is that the pitch diameter of the gear 116 be different than the pitch diameter of the gear 128.

The gear 118 also drives the gear 138 causing the shaft 140 to rotate about the moving axis A2 in the opposite direction as the direction in which the entire case 104 rotates about axis A1. If we now define the pitch diameters of the gears as follows:

P.D. Gear 126 = $P_1$
P.D. Gear 128 = $P_2$
P.D. Gear 118 = $P_3$
P.D. Gear 138 = $P_4$ It can be seen that if the following equation is satisfied $P_2/P_1 \times P_3/P_4 = 4$ then the sahft 140 will rotate four times about axis A2 relative to the case 104 during a single rotation of the case 104 about axis A1 relative to the base ring 102, and as previously shown, the rotations are in the opposite directions.

Therefore, for equal parameters which are the distance from axis A1 to axis A2 and the distance from axis A2 to axis A3, the kinematic behavior of the axis A3 of the shaft 146 will be identical with the behavior of the axis A3 in the two previously described mechanisms.

In all three embodiments, it will be noted that the reaction member, as exemplified by gear 26, or sprocket 84 or gear 128, is restrained from rotating with respect to the base by a ball detent type clutch system. The purpose of this system is to provide an overload release point which will slip in the event the output shaft encounters an excessive load along any of the four legs of its movement.

Kinematic analysis reveals an extremely large variation in the mechanical advantage between input torque and output thrust over various portions of the cycle. Hence an overload system anywhere in the input train would not be consistently effective. However, the relationship between output thrust and torque on the reaction member is remarkably consistent for all portions of the cycle. Therefore, the overload release system must be applied to the reaction member to be properly and consistently effective.

In some applications, it may be more convenient to directly connect the input shaft 74 to the rotating arm 54, FIG. 5, thereby eliminating the sprockets 70 and 66. Such a modification eliminates the effective speed reduction inherent in the design and greatly increases the input torque required for any given output load. Indeed, if the input shaft 74 is supported in adequate bearings, it becomes possible to support the rotating arm 54 directly on the input shaft eliminating the bearings 54 and 56. In some designs, it may be desirable to have the input gear 116 mesh with the gear 138 as an alternate input means (FIG. 7). For a greater reduction, the input gear 116 may drive another intermediate gear cluster which in turn would drive either the gear 118 or the gear 138. For a situation where no reduction is required, the input shaft 116 may be eliminated and the input shaft 110 may be directly connected with a suitable adaptor directly to the case 104 or cover 148.

The output path kinematic characteristics, both the near square output displacement pattern generated by axis A3 and the acceleration deceleration characteristics that the axis A3 experiences as it traverses each leg, are ideally suited for application of this drive as a single self-synchronized prime mover for the accumulating conveyor which is disclosed in my copending application, Ser. No. 163,666, filed July 19, 1971.

One system whereby this may be accomplished is shown in FIGS. 9 and 10 herein. In lieu of the two independent hydraulic cylinders shown in the copending application to actuate the first transfer means and the second transfer means, respectively, it is now possible to generate the complete cycle utilizing any of the three embodiments described above.

Referring to FIGS. 9 and 10, the transfer bars 302 support a bracket 150, which is designed to bridge and interconnect both transfer bars 302, yet not interfere with the other components mounted thereon. A bellcrank link 152 is pivotally connected to the lower end of bracket 150 through pivot pin 154. The horizontally extended end of the bellcrank link 152 is rotatably connected to the output shaft 24 of the square drive generator mechanism comprising components 2 and 40. It will be understood that the other embodiments might also be employed in its place without affecting the performance of the system.

The vertical segment of the bellcrank link 152 is connected to power bar drive link 156 through pivot pin 158. The other end of the link 156 is connected to the power bar drive bracket 160 through pivot pin 162; the power bar drive bracket is rigidly bolted to the power bars 314.

The path described by the output shaft 24 is shown by the dotted enclosed path P1. As the end of link 152 is guided along the path P1 by the output shaft 24, the transfer bar 302 and power bar 314 move through their required motion pattern. As will be seen in the application, the required motion cycle is as follows:

1. The initial position for a given cycle is with the transfer bar 302 and power bar 314 fully returned. 2. From this initial position, the power bar 314 extends through its forward stroke relative to the transfer bar 302.

3. At the completion of the preceding movement, the power bar 314 and the transfer bar 302 move forward as a pair relative to the frame. During this movement, there is substantially no relative movement between the power bar 314 and the transfer bar 302.

4. At the completion of the preceding movement, the power bar 314 returns relative to the transfer bar 302. During this movement, the transfer bar 302 remains substantially stationary in its extended position.

5. In the final step of the cycle, the transfer bar 302 and the power bar 314 return as a pair to their initial returned position. During this interval, there is substantially no relative movement between the transfer bar 302 and the power bar 314.

That this is substantially the same motion pattern that is generated by the linkage of FIGS. 9 and 10 may be visualized by reference to FIGS. 11, 12, 13 and 14, which are a set of sequential schematic line linkage drawings in which the path of the output shaft 24 is schematically represented by the dotted line square WXYZ. Bench marks R and S are provided as reference points to show relative movement.

Figure 11:
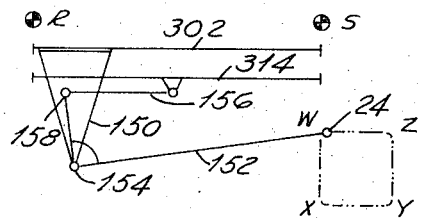

In FIG. 11, the output shaft 24 is in the corner W and the transfer bar 302 and power bar 314 are both in their returned positions.

As the output shaft 24 moves vertical downward from W to X, the bellcrank link 152 pivots about pin 154 causing pin 158 and link 156 to extend the power bar 314 forward relative to the transfer bar 302. During this interval, the transfer bar 302 is substantially stationary, oscillating very slightly in the return direction which is not disadvantageous.

Figure 12:
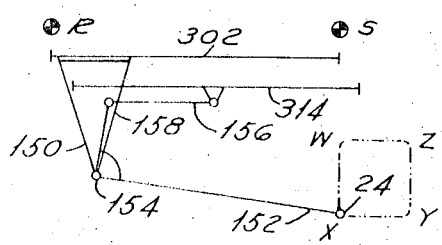

The position of the linkage after this movement is shown in FIG. 12 with the output shaft 24 at corner X.

Figure 13:
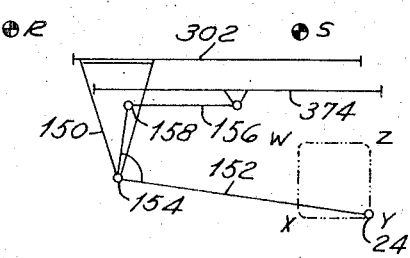

As the output shaft 24 moves in a substantially horizontal direction from X to Y, the entire linkage set experiences very little relative motion and the transfer bar 302 and power bar 314 extend through their combined forward stroke. The position reached at the end of this movement is shown in FIG. 13 with the output shaft 24 at corner Y.

Figure 14:
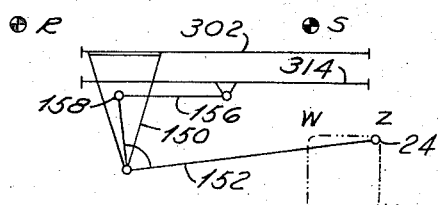

As the output shaft 24 moves vertically upward from Y to Z, the bellcrank link 152 pivots about pin 154 causing pin 158 and link 156 to return the power bar 314 rearward relative to the transfer bar 302. During this interval, the transfer bar 302 is substantially stationary in its forward position, again oscillating very slightly in the return direction, which is actually advantageous since it relieves the pressure of the pusher dogs on the workpiece as the pusher dogs are lowered. The position of the linkage after this movement is shown in FIG. 14 with the output shaft 24 at corner Z.

The final step of the cycle occurs as the output shaft 24 moves horizontally rearward from Z to W. The entire linkage again experiences very little relative movement and the transfer 302 and power bar 314 return through their combined return stroke. The position reached at the end of this movement is shown in FIG. 11 which is, of course, the same as at the beginning of a cycle.

The foregoing description demonstrates the suitability of the square generator mechanism, in any of its embodiments, as a single, self-synchronizing, drive means for the accumulator conveyor. No sequence controls are required. Indeed, if the input shaft 38 is connected to a suitable motor, that motor may be allowed to run continuously while the automatic cycle proceeds repeatedly.

Another significant advantage is that each of the four steps of the motion is inherently accelerated and decelerated. The shocks and jars associated with cylinders reaching the ends of their strokes are completely eliminated.

Other variations of this linkage which do not affect its function and which may be advantageous in being compatible with other external conditions, by way of example, are:

A. The link 156 may extend in the opposite direction from pin 158 as compared to its presently shown position. Accordingly, the bracket 160 and pin 162 would be relocated on the power bar 314 to compensate for the new direction of link 156.

B. The direction of the bellcrank offset may be inverted, i.e., the pin 158 connection between link 156 and link 152 may be placed below the pin 154 connection between link 152 and bracket 150. This necessitates a commensurate lengthening of the bracket 160. Furthermore, the motion phasing becomes inverted; this may be compensated for by reversing the direction of motion of the output shaft 24 around the output path P1.

In the linkage shown in FIG. 9 and FIG. 10, whose movement patterns were demonstrated in FIGS. 11 to 14, it is clear that the stroke of transfer bar 302 is equal to the length of one leg of the square P1 generated by the output shaft 24. In some applications, especially where long transfer strokes are required, it is convenient to use a linkage in which the stroke of the transfer bar 302 is greater than the length of one leg of the square P1, while still retaining the full self-synchronizing characteristics.

Such a linkage is shown in FIGS. 15 and 16. The output shaft 24 drives a master link 170 which is connected to a beam link 172 through a pin 174 on axis A4. The lower end of the link 172 is connected to a reaction link 176 through a pin 178 on axis A5; the other end of the reaction link 176 is connected to the conveyor base through a pin 180 on fixed axis A6. At some convenient distance between axis A4 and A5 on link 172, a guide link 182 is connected to link 172 by pin 184 on axis A7; the other end of the link 182 is connected to an outrigger 186 on the conveyor base by pin 188 on fixed axis A8.

Considering only this portion of the linkage, it can be seen that if the distance from axis A4 to axis A7 on link 172 is substantially the same as the distance from axis A7 to axis A8 of the link 182, the axis A4 is constrained to move along a substantially horizontal line through A8, while the axis A5 is constrained to move along an arc about A6, which for short distances may be considered as being a vertical line.

The upper end of link 172 is pivot connected to link 190 by pin 192 on axis A9. The other end of link 190 is connected to a transfer bar bracket 194 through pin 196. It can be seen therefore that any horizontal motion transmitted to the axis A4 by the link 170 is magnified at axis A9 by the ratio of the distance from A9 to A5 to the distance from A4 to A5. It is this ratio that determines the magnification factor by which the transfer bar 302 is greater than the movement of the output shaft between points X and Y and points W and Z on the path P1. The foregoing components of the linkage relate to the transmission of and magnification of horizontal movement of the output shaft 24.

The remainder of the linkage is concerned with converting the vertical motion of the output shaft 24 into relative motion of the power bar 314 to the transfer bar 302. A link 198 is connected at one end to link 170 through pin 200 on axis A10. At its other end the link 198 is connected to a triangular link 202 by pin 204 on axis A11. This triangular link is also pivot connected to link 172 by pin 192 on axis A9. The distance from axis A4 to axis A10 on link 170 is substantially the same as the distance from axis A9 to axis A11 on link 202; and the distance from axis A9 to axis A4 on link 172 is substantially the same as the distance from axis A11 to axis A10 on link 198. These four links therefore constitute a parallelogram linkage, and any angular movement of link 170 about axis A4, as is the case when output shaft 24 moves vertically, causes a corresponding angular movement of the link 202 about axis A9.

A link 206 is connected at one end to the triangular link 202 through pin 208 on axis A12 such that the angle between the line from A12 to A9 is approximately perpendicular to the line from A9 to A11; At its other end the link 206 is connected to power bar bracket 208 by pin 210. The power bar bracket 208 is rigidly connected to the power bar 314. Therefore any angular movement of the triangular link 202 about axis A9 causes a relative movement of the power bar 314 to the transfer bar 302.

In this application, the cycle takes place as the output shaft sequentially moves around the path P1 from X to W to Z to Y, which is the opposite to that required for the system shown in FIGS. 9 and 10. When the output shaft 24 is at position X, the link 170 is in its most clockwise position about axis A4, and the link 202 is in its most clockwise position about axis A9, and therefore the power bar 314 is in its returned position with respect to the transfer bar 302. Furthermore, the transfer bar 302 is in its returned position also as shown and this corresponds to the starting point of the cycle.

As the output shaft 24 progresses from X to W, the link 170 rotates counterclockwise about axis A4. The link 202 therefore rotates through a corresponding counterclockwise angle about axis A9 as driven by link 198. This in turn causes the power bar 314 to move forward with respect to the transfer bar 302 as driven by link 206. During this movement of the output shaft 24 from X to W, the axis A4 and the link 172 remain substantially stationary and therefore the transfer bar 302 remains substantially stationary.

The second portion of the cycle takes place as the output shaft 24 moves from point W to point Z. During this interval, the axis A4 moves through a horizontal stroke substantially the same as the distance from W to Z. The axis A9 moves through a greater stroke as determined by the magnification factor previously described. There is little, if any, angular movement of the link 170 during this interval; accordingly, there is little or no angular movement of the triangular link 202 about axis A9, and consequently, there is little or no relative movement of the power bar 314 to the transfer bar 302. Consequently, the transfer bar 302 and the power bar 314 move through a combined horizontal forward stroke a distance substantially equal to the horizontal movement of axis A9 while the power bar 314 remains in its extended position relative to the transfer bar 302.

The third portion of the cycle takes place as the output shaft 24 moves from Z to Y. The link 170 rotates about axis A4 in a clockwise direction while the axis A4, the link 172 and the axis A9 remain substantially stationary. The triangular link 202 also rotates in a clockwise direction about axis A9 as driven by link 198 from link 170. This causes the power bar 314 to return relative to the substantially stationary transfer bar 302.

The fourth and final portion of the cycle takes place as the output shaft 24 moves from Y to X. During this interval, the axis A4 returns through its horizontal stroke substantially the same as the distance from Y to Z. The axis A9 again moves through a greater stroke as determined by the magnification factor. There is again little, if any, angular movement of the link 170 during this interval, and, accordingly, there is little or no angular movement of the triangular link 202 about axis A9, and consequently, there is little or no relative movement of the power bar 314 with respect to the transfer bar 302. As a result, the transfer bar 302 and the power bar 314 return through a combined horizontal return stroke a distance substantially equal to the horizontal movement of axis A9 while the power bar 314 remains in its returned position relative to the transfer bar 302.

From the foregoing description, it may be seen that the movement pattern generated for the transfer bar 302 and power bar 314 is exactly the same as that required by their function in the accumulating conveyor of my above-referenced copending application, Ser. No. 163,666. It will further be seen that the forward and return stroke of the transfer bar is now greater than the width of the square output of the square generating mechanism and that this greater stroke is determined by the ratio of the distance from the axis A9 to axis A5 to the distance from axis A4 to axis A5 on the link 172.

It will be understood that the stroke of the transfer bar may be made less than the square output of the square generating mechanism by placing the axis A9 between axis A4 and A5.

Other inversions and modifications of this linkage may be visualized which are consistent with its basic function; by way of example, these are:

1. The link 198 may be placed on the other side of link 172; this would require that the triangular link 202 be reversed such that axis A11 is on the other side of axis A9, and further that the link 170 be extended beyond axis A4 such that axis A10 is on the other side of axis A4.

2. The link 176 may be eliminated and replaced by a vertical guide slide for the pin 178 on axis A5.

3. The link 182 may be eliminated and replaced by a horizontal guide slide for the pin 174 on axis A4.

4. The link 206 may be eliminated and replaced by a vertical guide slide connection between pin 208 on axis A12 and the power bar bracket 209, it being understood that the power bar bracket 209 would have to be shifted on the power bar 314 to compensate for the length of link 206.

5. The link 190 may be eliminated and replaced by a vertical guide slide connection between pin 192 on axis A9 and the transfer bar bracket 194, it being understood that the transfer bar bracket 194 would have to be shifted on the transfer bar 302 to compensate for the length of the link 190.

6. Axis A12 could be placed above axis A9 and pin 210 above pin 196, and therefore link 206 above link 190. This inversion would reverse the phasing of the movement of the power bar 314 relative to the transfer bar 302 with respect to the vertical movements of the output shaft 24, and would require that the cycle be generated with the output shaft moving in a reversed pattern, i.e., from W to X to Y to Z.

7. A system which is a combination of one or more of the above.

Other more complex linkages may be visualized to effect the interconnection of the output shaft 24 to the independent power bar 314 and transfer bar 302. The significant interrelationship is that each leg of the substantially square output path of the output shaft create one step of the four distinct steps of the transfer bar, power bar movements.

I claim:

1. In an accumulating conveyor which employs individually selectable work advancing means having as its principal actuating elements a primary transfer means and a secondary transfer means, which require a predetermined actuating relationship consisting of four distinct repetitive motion phases which are:

A. said secondary transfer means advances through its stroke relative to said primary transfer means while said primary transfer means remains substantially stationary, B. said primary transfer means and said secondary transfer means advance through a common stroke while there is substantially no relative movement between them, C. said secondary transfer means returns through its stroke relative to said primary transfer means while said primary transfer means remains substantially stationary, D. said primary transfer means and said secondary transfer means return through a common stroke while there is substantially no relative movement between them, that improvement which comprises a mechanical driving means comprising:

a. a motion generating means through which an output member is moved around a substantially square path, and b. interconnecting means comprising motion transmitting drive link members connecting said output member to each said primary and secondary transfer means and means connecting said drive link members to each other, whereby motion of said output member through said square path generates the aforesaid four distinct, positively-driven repetitive motion phases of said primary transfer means and said secondary transfer means, at least one of said drive link members being responsive to movement of said motion generating means along two opposite sides of said square path to shift said primary and secondary transfer means respectively in the advance and return common stroke and at least one of said drive link members being responsive to movement of said motion generating means along the sides normal to said first opposite sides to shift said primary and secondary transfer means relative to each other.

2. An apparatus as defined in claim 1 in which said motion generating means comprises:
   a. a frame member,
   b. a reaction member mounted on said frame member,
   c. a first rotating member mounted on said frame to rotate about a first axis,
   d. a second rotating member mounted on said first rotating member to rotate about a second axis displaced from said first axis,
   e. an output member mounted on said second rotating member to rotate about a third axis displaced from said second axis a distance of less than one-half the displacement distance of said second axis from said first axis while also revolving about said first and second axes,
   f. coupling means between said second rotating member and said reacting member whereby rotation of said first rotating member in said frame member about said first axis effects rotation of said second rotating member relative to said first rotating member causing said second rotating member to revolve about said first axis and said output member to revolve about said first and second axes, and
   g. driving means to impart rotation to one of said rotating members to effect rotation of said first rotating member around said first axis.

3. An apparatus as defined in claim 2 in which said drive means comprises:
   a. a rotary input shaft mounted on said frame on said first axis,
   b. a first drive gear mounted on said input shaft, and
   c. a second drive gear mounted on said second rotating member and in mesh with said first drive gear.

4. An apparatus as defined in claim 2 in which said drive means comprises:
   a. a rotary input shaft mounted on said frame on said first axis,
   b. a first drive sprocket mounted on said shaft,
   c. a second drive sprocket mounted on said rotating member, and
   d. a continuous drive means engaging said respective sprockets.

5. An apparatus as defined in claim 1 in which said interconnecting means comprises:
   a. a first coupling member mounted on said primary transfer means,
   b. a second coupling member mounted on said secondary transfer means,
   c. guide means mounted on a frame,
   d. a lever member mounted on said guide means,
   e. a first drive link member connecting said lever member and said output member,
   f. a third coupling means between said lever member and said first coupling member,
   g. a bellcrank member mounted on said lever member,
   h. a first interconnecting means between said first drive link member and said bellcrank member, and
   i. a second drive link member between said bellcrank member and said second coupling member.

6. An apparatus as defined in claim 5 in which said guide means for said lever comprises a pair of spaced links pivoted at one end to said frame member and at the other end to said lever adjacent one end, and said third coupling means comprises a link pivoted at one end to said first coupling member and at the other end to the other end of said lever.

7. An apparatus as defined in claim 5 in which said first interconnecting means comprises a link extending from a pivotal connection on said first drive member to one end of said bellcrank lever and said second interconnecting means comprises a link pivoted at one end to the other end of said bell crank lever and at the other end to said second coupling member.

8. In an accumulating conveyor, having as its principal actuating elements a primary transfer means and a secondary transfer means, which require a predetermined actuating relationship consisting of four distinct repetitive motion phases which are:
   A. said secondary transfer means advances through its stroke relative to said primary transfer means while said primary transfer means remains substantially stationary,
   B. said primary transfer means and said secondary transfer means advance through a common stroke while there is substantially no relative movement between them,
   C. said secondary transfer means returns through its stroke relative to said primary transfer means while said primary transfer means remains substantially stationary,
   D. said primary transfer means and said secondary transfer means return through a common stroke while there is substantially no relative movement between them, that improvement which comprises a mechanical driving means comprising:
   a. a motion generating means through which an output member is moved around a substantially square path, and
   b. interconnecting means comprising:
      1. a first coupling member mounted on said primary transfer means,
      2. a second coupling member mounted on said secondary transfer means,
      3. a first drive link member connected between said first coupling member and said output member,
      4. an offset member mounted on said first drive link member, and
      5. a second drive link member between said second coupling member and said offset member whereby motion of said output member through said square path generates the aforesaid four distinct repetitive motion phases of said primary and secondary transfer means.

9. In an accumulating conveyor, having as its principal actuating elements a primary transfer means and a secondary transfer means, which require a predetermined actuating relationship consisting of four distinct repetitive motion phases which are:
   A. said secondary transfer means advances through its stroke relative to said primary transfer means while said primary transfer means remains substantially stationary, B. said primary transfer means and said secondary transfer means advance through a common stroke while there is substantially no relative movement between them,
C. said secondary transfer means returns through its stroke relative to said primary transfer means while said primary transfer means remains substantially stationary,
D. said primary transfer means and said secondary transfer means return through a common stroke while there is substantially no relative movement between them, that improvement which comprises a mechanical driving means comprising:
  a. a motion generating means through which an output member is moved around a substantially square path, and
  b. interconnecting means comprising:
    1. a first fastening bracket on said primary transfer means,
    2. a second fastening bracket on said secondary transfer means,
  c. a first drive link member connecting said first fastening bracket and said output member,
  d. an arm extending at an angle to said first drive link member, and
  e. a second drive link member connecting said arm and said second fastening bracket,
    wherein motion of said output member in a direction parallel to said transfer means will drive said primary and secondary transfer means in a common stroke, and motion of said output member in a direction transverse to said transfer means will shift said transfer means relative to each other.

10. In an accumulating conveyor having as its principal actuating elements a primary transfer means and a secondary transfer means, which require a predetermined actuating relationship consisting of four distinct repetitive motion phases which are:
A. said secondary transfer means advances through its stroke relative to said primary transfer means while said primary transfer means remains substantially stationary,
B. said primary transfer means and said secondary transfer means advance through a common stroke while there is substantially no relative movement between them,
C. said secondary transfer means returns through its stroke relative to said primary transfer means while said primary transfer means remains substantially stationary,
D. said primary transfer means and said secondary transfer means return through a common stroke while there is substantially no relative movement between them, that improvement which comprises a mechanical driving means comprising:
  a. a motion generating means through which an output member is moved around a substantially square path comprising:
    1. a frame member,
    2. a reaction member mounted on said frame member for rotation on a first axis, and an overload release means to restrain said rotation in the absence of a predetermined torque load on said reaction member,
    3. a first rotating member mounted on said frame to rotate about said first axis,
    4. a second rotating member mounted on said first rotating member to rotate about a second axis displaced from said first axis,
    5. an output member mounted on said second rotating member to rotate about a third axis displaced from said second axis a distance of less than one-half the displacement distance of said second axis from said first axis while also revolving about said first and second axes,
    6. coupling means between said second rotating member and said reacting member whereby rotation of said first rotating member in said frame member about said first axis effects rotation of said second rotating member relative to said first rotating member causing said second rotating member to revolve about said first axis and said output member to revolve about said first and second axes, and
    7. driving means to impart rotation to one of said rotating members to effect rotation of said first rotating member around said first axis, and
  b. interconnecting means comprising motion transmitting drive link members connecting said output member to each said primary and secondary transfer means and means connecting said drive link members to each other whereby motion of said output member through said square path generates the aforesaid four distinct repetitive motion phases of said primary transfer means and said secondary transfer means, at least one of said drive link members being responsive to movement of said motion generating means along two opposite sides of said square path to shift said primary and secondary transfer means respectively in the advance and return common stroke and at least one of said drive link members being responsive to movement of said motion generating means along the sides normal to said first opposite sides to shift said primary and secondary transfer means relative to each other.

11. An apparatus as defined in claim 10 in which said release means comprises a detent located in one of said frame and reaction members, a recess formed in the other of said members, and resilient means biasing said detent into said recess.

12. In an accumulating conveyor, having as its principal actuating elements a primary transfer means and a secondary transfer means, which require a predetermined actuating relationship consisting of four distinct repetitive motion phases which are:
A. said secondary transfer means advances through its stroke relative to said primary transfer means while said primary transfer means remains substantially stationary,
B. said primary transfer means and said secondary transfer means advance through a common stroke while there is substantially no relative movement between them,
C. said secondary transfer means returns through its stroke relative to said primary transfer means while said primary transfer means remains substantially stationary,
D. said primary transfer means and said secondary transfer means return through a common stroke while there is substantially no relative movement between them, that improvement which comprises a mechanical driving means comprising:

a. a motion generating means through which an output member is moved around a substantially square path, comprising:
1. a frame member,
2. an internal gear mounted on said frame member, centered on a first axis,
3. a first rotating member mounted on said frame to rotate about said first axis,
4. a second rotating member mounted on said first rotating member to rotate about a second axis displaced from said first axis,
5. an output member mounted on said second rotating member to rotate about a third axis displaced from said second axis a distance of less than one-half the displacement distance of said second axis from said first axis while also revolving about said first and second axes,
6. coupling means between said second rotating member and said internal gear comprising an external gear mounted on said second rotating member in mesh with said internal gear, said external gear and said internal gear having pitch diameter ratio of 1 to 4,
7. driving means to impart rotation to one of said rotating members to effect rotation of said first rotating member around said first axis, and b. interconnecting means comprising motion transmitting drive link members connecting said output member to each said primary and secondary transfer means and means connecting said drive link members to each other whereby motion of said output member through said square path generates the aforesaid four distinct repetitive motion phases of said primary transfer means and said secondary transfer means, at least one of said drive link members being responsive to movement of said motion generating means along two opposite sides of said square path to shift said primary and secondary transfer means respectively in the advance and return common stroke and at least one of said drive link members being responsive to movement of said motion generating means along the sides normal to said first opposite sides to shift said primary and secondary transfer means relative to each other.

13. In an accumulating conveyor, having as its principal actuating elements a primary transfer means and a secondary transfer means, which require a predetermined actuating relationship consisting of four distinct repetitive motion phases which are:

A. said secondary transfer means advances through its stroke relative to said primary transfer means while said primary transfer means remains substantially stationary, B. said primary transfer means and said secondary transfer means advance through a common stroke while there is substantially no relative movement between them, C. said secondary transfer means returns through its stroke relative to said primary transfer means while said primary transfer means remains substantially stationary, D. said primary transfer means and said secondary transfer means return through a common stroke while there is substantially no relative movement between them, that improvement which comprises a mechanical driving means comprising:

a. a motion generating means through which an output member is moved around a substantially square path, comprising:
1. a frame member,
2. a first sprocket mounted on said frame member, centered on a first axis,
3. a first rotating member mounted on said frame to rotate about said first axis,
4. a second rotating member mounted on said first rotating member to rotate about a second axis displaced from said first axis,
5. an output member mounted on said second rotating member to rotate about a third axis displaced from said second axis a distance of less than one-half the displacement distance of said second axis from said first axis while also revolving about said first and second axes,
6. coupling means between said second rotating member and said first sprocket comprising a second sprocket having a pitch diameter one-fourth of said first sprocket and mounted on said second rotating member, and a continuous flexible drive means engaging said respective sprockets,
7. driving means to impart rotation to one of said rotating members to effect rotation of said first rotating member around said first axis, and b. interconnecting means comprising motion transmitting drive link members connecting said output member to each said primary and secondary transfer means and means connecting said drive link members to each other whereby motion of said output member through said square path generates the aforesaid four distinct repetitive motion phases of said primary transfer means and said secondary transfer means, at least one of said drive link members being responsive to movement of said motion generating means along two opposite sides of said square path to shift said primary and secondary transfer means respectively in the advance and return common stroke and at least one of said drive link members being responsive to movement of said motion generating means along the sides normal to said first opposite sides to shift said primary and secondary transfer means relative to each other.

14. In an accumulating conveyor, having as its principal actuating elements a primary transfer means and a secondary transfer means, which require a predetermined actuating relationship consisting of four distinct repetitive motion phases which are:

A. said secondary transfer means advances through its stroke relative to said primary transfer means while said primary transfer means remains substantially stationary, B. said primary transfer means and said secondary transfer means advance through a common stroke while there is substantially no relative movement between them, C. said secondary transfer means returns through its stroke relative to said primary transfer means while said primary transfer means remains substantially stationary, D. said primary transfer means and said secondary transfer means return through a common stroke while there is substantially no relative movement between them, that improvement which comprises a mechanical driving means comprising:
a. a motion generating means through which an output member is moved around a substantially square path, comprising:
1. a frame member,
2. a first external gear mounted on said frame member, centered on a first axis,
3. a first rotating member mounted on said frame to rotate about said first axis,
4. a second rotating member mounted on said first rotating member to rotate about a second axis displaced from said first axis,
5. an output member mounted on said second rotating member to rotate about a third axis displaced from said second axis a distance of less than one-half the displacement distance of said second axis from said first axis while also revolving about said first and second axes,
6. coupling means between said second rotating member and said first external gear comprising a second external gear mounted on said second rotating member, a third external gear in mesh with said first external gear and mounted to revolve about said first axis on a shaft journaled in said first rotating member, and a fourth external gear on said shaft in mesh with said second external gear,
7. driving means to impart rotation to one of said rotating members to effect rotation of said first rotating member around said first axis, and
b. interconnecting means comprising motion transmitting drive link members connecting said output member to each said primary and secondary transfer means and means connecting said drive link members to each other whereby motion of said output member through said square path generates the aforesaid four distinct repetitive motion phases of said primary transfer means and said secondary transfer means, at least one of said drive link members being responsive to movement of said motion generating means along two opposite sides of said square path to shift said primary and secondary transfer means respectively in the advance and return common stroke and at least one of said drive link members being responsive to movement of said motion generating means along the sides normal to said first opposite sides to shift said primary and secondary transfer means relative to each other.

15. An apparatus as defined in claim 14 in which said drive means comprises:
a. a rotary input shaft on said frame on said first axis, and
b. a first drive gear mounted on said shaft in mesh with said fourth external gear.

* * * * *